United States Patent
Badeja et al.

(10) Patent No.: US 9,995,593 B2
(45) Date of Patent: Jun. 12, 2018

(54) METHOD FOR OPERATING A SENSOR ARRAY

(71) Applicant: Robert Bosch GmbH, Stuttgart (DE)

(72) Inventors: Michael Badeja, Leonberg Reutlingen (DE); Andreas Krauss, Tuebingen (DE); Richard Fix, Weil im Schoenbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 293 days.

(21) Appl. No.: 14/901,185

(22) PCT Filed: May 7, 2014

(86) PCT No.: PCT/EP2014/059350
§ 371 (c)(1),
(2) Date: Dec. 28, 2015

(87) PCT Pub. No.: WO2014/206618
PCT Pub. Date: Dec. 31, 2014

(65) Prior Publication Data
US 2016/0169704 A1    Jun. 16, 2016

(30) Foreign Application Priority Data
Jun. 27, 2013   (DE) ................. 10 2013 212 485

(51) Int. Cl.
*G01D 3/036*      (2006.01)
*G01L 19/00*      (2006.01)

(52) U.S. Cl.
CPC ...... *G01D 3/036* (2013.01); *G01L 2019/0053* (2013.01)

(58) Field of Classification Search
CPC .................................................. G01D 3/036
See application file for complete search history.

(56) References Cited

U.S. PATENT DOCUMENTS 5,551,283 A  *  9/1996  Manaka ............... G01F 1/6845
                                                    340/634
2003/0089100 A1*  5/2003  Ueno ................. B01D 53/0454
                                                    60/277

FOREIGN PATENT DOCUMENTS

CN          1720428 A       1/2006
CN          1802552 A       7/2006
(Continued)

OTHER PUBLICATIONS

International Search Report for PCT/EP2014/059350, dated Jul. 25, 2014.

*Primary Examiner* — Robert R Raevis
(74) *Attorney, Agent, or Firm* — Norton Rose Fulbright US LLP; Gerard Messina

(57) ABSTRACT

A sensor array and a method are provided for operating a sensor array with a first sensor and a second sensor, the second sensor being designed for an operation at an ambient temperature, the first sensor representing a heated sensor, which is designed for being operated at an operating temperature that is above the ambient temperature, the first and the second sensor being connected to each other via a carrier, the carrier bringing about thermal coupling between the first and the second sensor, the first sensor being heated to the operating temperature during a first phase, and a measurement being carried out by the first sensor during the first phase, the heating being switched off or at least being reduced in a second phase, and a measurement being carried out by the second sensor during the second phase, an increased temperature of the second sensor as a result of the heating during the first phase being taken into account when evaluating the measurement of the second sensor.

16 Claims, 5 Drawing Sheets

(56) References Cited

FOREIGN PATENT DOCUMENTS

| | | |
|---|---|---|
| CN | 1989404 A | 6/2007 |
| DE | 3829517 | 3/1990 |
| DE | 19642107 | 4/1998 |
| DE | 102005029841 | 3/2006 |
| DE | 102005042485 | 3/2007 |
| DE | 102010002979 | 9/2011 |
| EP | 1530028 | 5/2005 |

* cited by examiner

METHOD FOR OPERATING A SENSOR ARRAY

FIELD OF THE INVENTION

The present invention relates to a method for operating a sensor array and to a sensor array.

BACKGROUND INFORMATION

A micromechanical device having an integrated heater is known from German Published Patent Application No. 10 2005 029 841. The micromechanical device may have a sensor element, which, for example, is developed as a temperature sensor. In addition, the sensor element may be designed in the form of a pressure sensor.

German Published Patent Application No. 10 2005 042 485 describes a sensor array for a media sensor, an oil state sensor, and a method for manufacturing a sensor array. The sensor array can include a plurality of sensor structures, in a monolithically integrated form, for ascertaining a plurality of physical and/or chemical variables of a medium that abuts the sensor array.

SUMMARY

An objective of the present invention is to provide an improved method for operating a sensor array and an improved sensor array.

One advantage of the described method is that a sensor array can be operated by a first and a second sensor, the first sensor being operated above the ambient temperature and the second sensor being operated at the ambient temperature. Since the increased temperature is disadvantageous for the second sensor, the sensors are used for measurements during different time phases. In the first phase, during which the first sensor is heated to the operating temperature, a simultaneous measurement is carried out with the aid of the first sensor. In a second phase, during which the heating element for the first sensor is switched off or is at least reduced in its output, a measurement with the aid of the second sensor takes place. Since the second sensor is exposed to a temperature that is higher than the ambient temperature despite the two different phases, the increased temperature is taken into account when analyzing the measurement of the second sensor. The second sensor can therefore likewise be operated with sufficient accuracy, despite being exposed to a temperature that exceeds the ambient temperature because of the sensor's placement on a sensor array together with the first sensor.

In one specific embodiment, the temperature of the temperature array is detected and the heating during the first phase is controlled in such a way that a maximum temperature will not be exceeded for the second sensor. This ensures that the second sensor is still able to function and the measurement of the second sensor is usable.

In one further specific embodiment, the heating of the sensor array is limited in such a way that either the first phase is temporally restricted and/or a time interval between two first phases is prolonged in order not to exceed the maximum temperature for the second sensor. Maintaining the maximum temperature for the second sensor is therefore easily ensurable.

In one further specific embodiment, the second sensor carries out a comparison measurement during the first phase. The comparison measurement may be used for evaluating the operativeness of the first sensor and/or the second sensor, so that it is possible to check the operativeness of the first and/or second sensor.

In one further specific embodiment, a plurality of first phases is carried out at time intervals, the second phase taking place between two first phases. This allows an intermittent use of the first and second sensors, which ensures a virtually continuous supply of measured values both from the first and the second sensor and also ensures that a maximum temperature will not be exceeded for the second sensor nevertheless.

In one further development, first phases for two first sensors are carried out at least at a time offset or consecutively. This results in a reduced temperature in comparison with a simultaneous operation of the first phases of the first sensors, which lessens any adverse effect on the operativeness of the second sensor(s). This procedure is advantageous insofar as the temperature increase is reduced in comparison with a continuous heating operation of the first sensors. In addition, a lower temperature gradient across the extension of the sensor array or across the extension of a second sensor is achievable in this manner. First sensors and second sensors can therefore be accommodated inside a shared housing. The shared housing results in lower costs, especially in the case of sensors for which a media access must be provided, such as pressure sensors, gas sensors or moisture sensors, for instance.

In one further specific embodiment, a preheating phase takes place during the first phase. The first sensor is heated to a first temperature during the preheating phase. In a subsequent measuring phase, the first sensor is used for carrying out two measurements at two different temperatures. The heating element is controlled accordingly for this purpose in order to adjust the two different temperatures. Because of the two measurements at two different temperatures, a more precise measurement by the first sensor is possible.

In one further specific embodiment, a cooling phase, during which the first sensor carries out a third measurement, takes place following the first phase. This makes it possible to obtain a further measured value, which can be used for checking the measured values of the first sensor.

In one further specific embodiment, an ambient temperature is estimated, taking the output of the heating element and a temperature measurement on the sensor array into account. The estimated ambient temperature is considered when analyzing the measurement of the second sensor. More specifically, the measurement of the second sensor is calibrated to the ambient temperature, or the measurement of the second sensor is able to be checked for a malfunction. The measuring accuracy of the second sensor is therefore increased on the one hand, and a malfunction of the second sensor is able to be detected in an uncomplicated manner on the other.

In one further specific embodiment, the first phase is used for heating or baking out the second sensor, which makes it possible to improve the measuring accuracy of the second sensor. The increased operating temperature of the first sensor, which is actually disadvantageous for operating the second sensor, is thereby able to be used for the advantageous heating or baking out of the second sensor.

The described sensor array is particularly suitable for first sensors which, for example, are developed as a heating plate having a heated diaphragm, a heated sensor, mass-flow sensor, a sensor for measuring thermal conductivity, gas sensor, heated chemical gas sensor, or as a metal oxide sensor. In addition, the described sensor array is advantageously suitable for second sensors which, for example, are developed as polymer-coated sensors, capacitive sensors, calorimetric sensors, acceleration sensors, angular acceleration sensors, magnetic field sensors, air pressure sensors, moisture sensors, gas sensors, or as a sensor having a field-effect transistor. In the case of the described sensors, it is advantageously possible to tolerate the increased operating temperature of the first sensor, and to simultaneously operate the second sensor together with the first sensor on a sensor array with sufficient accuracy.

In one further specific embodiment, the first and the second sensor are accommodated inside a housing that has a media access. The first sensor is situated closer to the media access than the second sensor. This offers the advantage that the first sensor, which has a higher operating temperature during the first phase, is cooled by the media flow. The second sensor is therefore protected from excessive temperatures. The first sensor, for example, may be disposed so as to abut the media access and/or be situated directly underneath the media access.

In one further specific embodiment, the carrier is made from a heat-conducting material, so that a uniform distribution of the heat of the first sensor in relation to the second sensor or multiple second sensors is achievable.

In one further specific embodiment, the second sensor is situated on an evaluation circuit. The evaluation circuit is disposed on the carrier, on which the first sensor is situated as well. Such a placement achieves better thermal decoupling between the second sensor and the first sensor, since the evaluation circuit constitutes a thermal insulation between the first and the second sensor or between the carrier and the second sensor.

In one further specific embodiment, the evaluation circuit is connected to the carrier via a thermally conductive connection layer. The connection layer may preferably take the form of an adhesive layer. The thermal linkage of the evaluation circuit achieves better heat dissipation or better thermal coupling between the second sensor and the carrier.

DETAILED DESCRIPTION

Over the past few years, numerous sensors have been developed in silicon technology for instance on the basis of MEMS, which may be used for measuring different physical or chemical variables. The sensors can be subdivided into two types of sensors. The first sensors should be operated at an operating temperature that is considerably above the ambient temperature. 25° C., for example, is assumed as ambient temperature. The operating temperature of the first sensors is usually more than 30° C. higher than the ambient temperature. The second sensors should be operated at the ambient temperature or within a range about an ambient temperature. The range about the ambient temperature may amount to ±10°, for instance. The second sensors operate with reduced accuracy when heated above the ambient temperature of 25°.

Mass-flow sensors or sensors for measuring the thermal conductivity, or heated chemical gas sensors such as metal-oxide sensors, for instance, could be examples of first sensors.

Second sensors, for example, are pressure sensors, where heating of the piezoelectric sensing elements, for instance, leads to a falsification of the measurement result. While it is true that a pressure sensor often also includes a temperature-measuring element that can be used for a temperature correction, an accurate temperature compensation can be carried out only if all elements of the pressure sensor are at a thermal equilibrium. For example, if an uneven temperature increase occurs on the pressure sensor due to external heating, i.e., when a temperature gradient arises at the pressure sensor, this may lead to false results in the temperature correction. To be mentioned as second sensors, for example, are polymer-coated, capacitive, calorimetrically measuring sensors, which are based on a temperature-dependent adsorption or a temperature-dependent distribution of analytes between air and polymer.

A basic idea of the present invention now consists of jointly operating first and second sensors on a sensor array and of compensating or advantageously utilizing the technically undesired temperature increase for the second sensors.

Hereinafter, the present invention will be described on the basis of one first sensor and one second sensor, but the invention can also be used for multiple first sensors and/or multiple second sensors for a sensor array.

Figure 1:
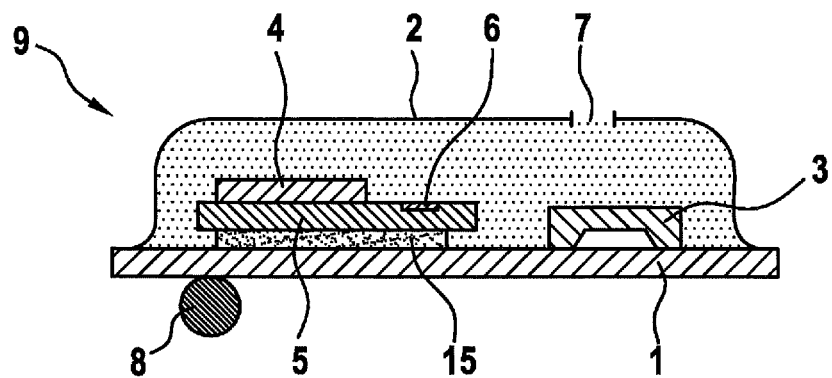
FIG. 1 shows a schematic representation of a sensor array.

FIG. 1 shows a schematic cross-section of a sensor array 9, which includes a carrier 1, on which a first sensor 3 and a second sensor 4 are situated. In the exemplary embodiment illustrated, first sensor 3 sits directly on carrier 1. Second sensor 4 is disposed on an evaluation circuit 5, which may be situated on carrier 1. Depending on the specific embodiment selected, second sensor 4 may also be mounted directly on carrier 1. Depending on the individual embodiment, it is also possible that a further second sensor 6 is situated on or in evaluation circuit 5. Evaluation circuit 5 is connected to the first and/or second sensor(s) 3, 4 so as to analyze the measuring signals from first sensor 3 and second sensor or sensors 4 and to output corresponding signals to the outside.

In addition, carrier 1 has electrical connections 8, which are developed in the form of solder connections, such as solder balls, for example. Depending on the specific embodiment selected, carrier 1 may be designed to be heat-conducting and additionally include wiring planes for an electrical connection between first sensor 3 and evaluation circuit 5 or between evaluation circuit 5 and electrical connections 8. In some specific embodiments, it is also possible to mount multiple first sensors 3 and/or multiple second sensors 4 on carrier 1.

In the specific embodiment illustrated, carrier 1 is covered by a housing 2. Depending on the specific embodiment selected, housing 2 may be omitted or an embedding into a mold material may be used instead of a housing 2. In the exemplary embodiment shown, housing 2 includes a media access 7 in the form of an opening, so that a medium such as gas or a fluid is able to flow into housing 2. Media access 7 is situated in close proximity to first sensor 3, in particular above first sensor 3.

First sensor 3 is a sensor whose normal operating temperature is considerably higher than the ambient temperature. For example, first sensor 3 may be provided as a heated sensor, a heating plate having a heated diaphragm, a mass-flow sensor, a thermal conductivity-measuring sensor, a gas sensor, a heated chemical gas sensor, and/or as a metal-oxide sensor. First sensors 3 could also be developed as heated sensors. Depending on the specific embodiment selected, however, it is also possible to provide heating elements, which are made available independently of first sensors 3 and are used for heating first sensors 3 to the increased operating temperature. For example, a first sensor 3 may be developed in the form of a silicon-based micro-heating plate, which includes a metal oxide on the basis of indium oxide or tin oxide.

The second sensors are developed as sensors whose normal operating temperature lies in the range of the ambient temperature. The second sensor, for instance, is developed as a polymer-coated sensor, capacitive sensor, calometrically measuring sensor, acceleration sensor, angular acceleration sensor, magnetic field sensor, air-pressure sensor, moisture sensor, gas sensor and/or as a sensor having field-effect transistors.

Carrier 1 represents a base plate, which is developed in the form of a thin circuit board, for example. The circuit board may have electrical contacts on the top and bottom surface, and/or wiring planes between the top and bottom surface. The wiring planes offer virtually uninterrupted metal planes that ensure good electrical and thermal conductivity and provide excellent electrical shielding. This is achieved by the ground plane, for instance.

Second sensor 4 is coupled to carrier 1, preferably in a manner that provides satisfactory thermal conductivity. For instance, this is accomplished by a layer having satisfactory thermal conductivity, such as a thermally conductive bonding layer. In the specific embodiment illustrated, evaluation circuit 5 preferably is connected to carrier 1 via a connection layer 15 that ensures good thermal conductivity, such as a thermally conductive bonding layer. The thermal coupling results in a lower temperature differential with respect to the ambient temperature. Temperature gradients within the sensor array and in particular across a second sensor 4 are kept to a minimum or avoided in addition.

Since first sensor 3 is situated as closely as possible to the media access, an excellent heat dissipation out of housing 2 is possible through convection of the medium. This keeps the overall heating of housing 2 to a minimum. The thermal conductivity of a first sensor 3 is able to be reduced by omitting metallic coatings in carrier 1, so that the thermal coupling between first and second sensors 3, 4 is poorer, and more energy is able to dissipate from first sensors 3, for instance via housing 2 or carrier 1, directly to the environment close to sensor 3. Preferably, minimal thermal coupling of the heated region of first sensor and carrier 1 is provided, which may be achieved, for instance, by developing first sensor 1 as a miniaturized sensor which is thermally decoupled from the substrate and has a heating plate with a heated diaphragm.

In an effort to keep a temperature differential between second sensors 4 and the environment as low as possible, it is furthermore advantageous to provide numerous connections having excellent thermal conductivity in the vicinity of the sensors, such as solder connections and electrical lines or metallization planes. In a ball-grid array housing, for instance, as many solder connections as possible to a further circuit board may be provided. The temperature gradient between the second sensors is additionally able to be kept to a minimum by tightly arranging second sensors that react sensitively to a temperature gradient on a separate element. For example, in the exemplary embodiment shown, a pressure sensor and a temperature sensor are situated on an evaluation circuit 5. Instead of the evaluation circuit, a separate circuit board on which the second sensors are disposed may be provided as well, in which case the separate circuit board is mounted on carrier 1.

Sensor array 9, for example, may be used in wireless devices, in household appliances, gas-warning systems, medical technology devices such as breathing gas analysis, in lab-on-chip analytics, and for use in fluids, for instance for a fuel or bodily fluids analysis.

Figure 2:
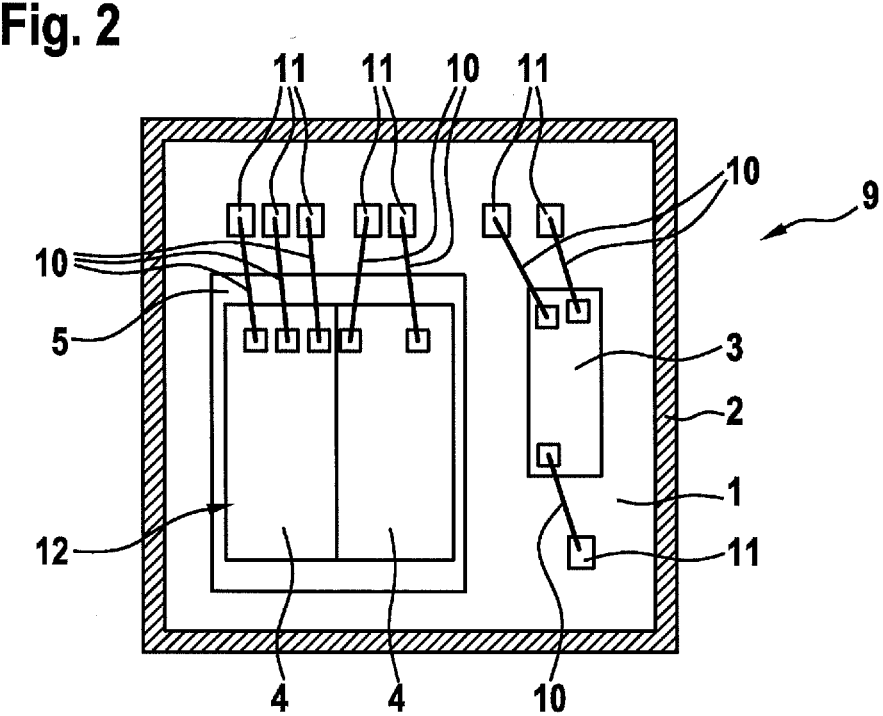
FIG. 2 shows a schematic representation of another specific embodiment of a sensor array.

FIG. 2 shows a further schematic illustration of a sensor array 9 in a view from above. A first sensor 3, which is developed in the form of a gas sensor having a micro-heating plate, for example, is situated on carrier 1. First sensor 3 is connected to contact surfaces 11 of carrier 1 in an electrically conductive manner via contact wires 10. Second sensors 4, which are integrated into an element 12, are situated next to first sensor 3. Element 12 in turn is situated on an evaluation circuit 5, which is resting on carrier 1. Moreover, second sensors 4 are electrically connected by way of contact wires 10 to contact surfaces 11 of carrier 1. Via electrical contacts (not shown), evaluation circuit 5 is connected both to first and second sensors 3, 4 and to carrier 1. FIG. 2 shows a cross-section of housing 2, which surrounds first sensor 3 and second sensors 4 including evaluation circuit 5. Element 12 may be developed in the form of a further carrier or a substrate, for instance.

Figure 3:
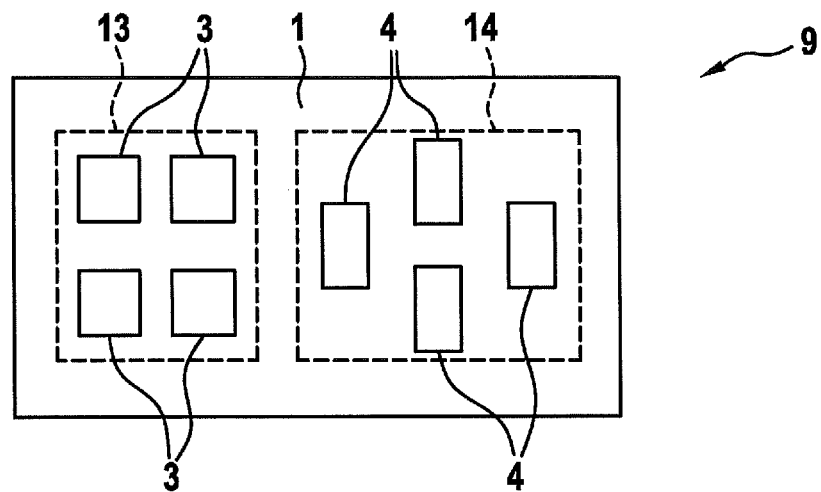
FIG. 3 shows a schematic representation of another specific embodiment of a sensor array.

FIG. 3 shows a further specific embodiment of a sensor array 9, in which four first sensors 3 are situated on a carrier 1 spatially separated from four second sensors. First sensors 3 are situated in a first region 13. Located at a distance therefrom are second sensors 4 in a second region 14. First and second regions 13, 14 are identified by dashed lines. In this way it is possible to specify the maximum possible distance from first sensors 3, at least for individual second sensors 4, which reduces the thermal influence of first sensors 3 on these second sensors 4.

Figure 4:
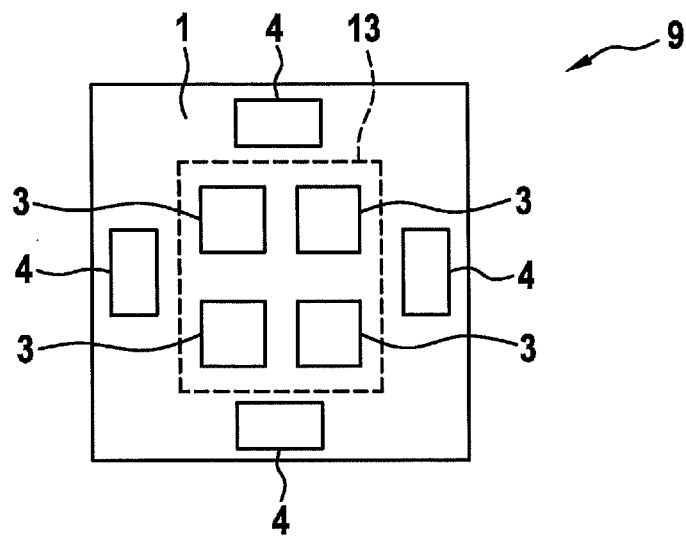
FIG. 4 shows a further specific embodiment of a sensor array.

FIG. 4 shows a further specific embodiment of a sensor array 9. In this development, first sensors 3 are situated in a first region 13, which is located in the center of carrier 1. First region 13 is identified by dashed lines. Second sensors 4 are distributed around first region 13. In this way second sensors 4 have the most uniform distance from first region 13, so that second sensors 4 receive the most even heat input possible by first sensors 3.

The method for operating the sensors will be described in greater detail in the following text. One basic idea of the present invention consists of heating the heated first sensors in the first phases and of carrying out measurements. Second sensors 4, which are not heated, are preferably used for a measurement acquisition in a temporally second phase. The temporally second phases are offset in time from the temporally first phases, so that an intermittent temporal operation of the first sensors is employed. This method is advantageous insofar as the overall temperature increase of the sensor array is less than in a continuous heating operation of the first sensor(s). In addition, a lower temperature gradient across the extension of second sensors 4 or across the extension of carrier 1 is obtainable in this manner. Only one first sensor 3, multiple first sensors 3, or all first sensors 3 of sensor array 9 is/are able to be operated during a heated first phase.

During the second phases, when no heating takes place, one or more second sensor(s) 4 may be used for acquiring measured values. The use of first sensors 3 therefore makes it possible to carry out corresponding measurements for physical and/or chemical variables during the first phase in the heating operation. In addition, in the second phase, measurements for physical and/or chemical variables are able to be undertaken with the aid of second sensors 4. This makes it possible to realize a time interval which is characterized by a defined temporal temperature gradient or a virtually constant temperature for the measurement by second sensors 4 during the second phase without heating. The acquisition of the measured values and/or the evaluation of the measured values are/is carried out by evaluation circuit 5. For instance, a constant temperature gradient is able to be generated in second sensors 4 as a result of an alternating operation of first sensors 3. The temperature gradient, for example, may be taken into account in a correction of the measured values of the second sensor(s).

Figure 5:
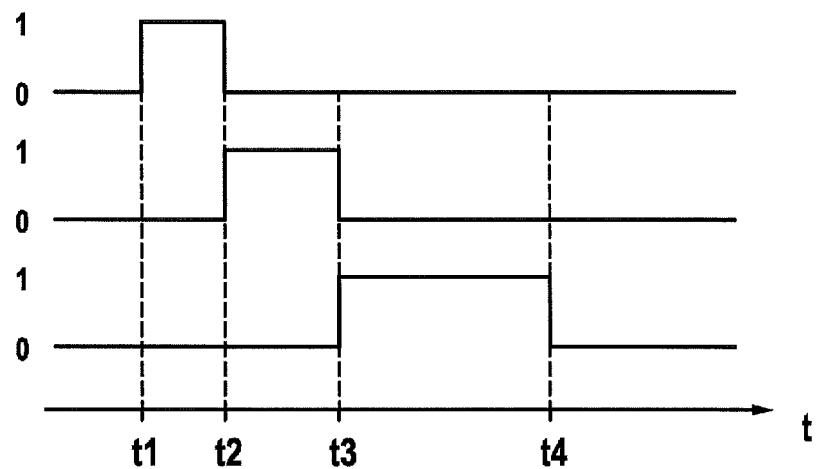
FIG. 5 shows a diagram of a time characteristic of first phases of the first sensors.

FIG. 5 schematically illustrates three characteristic curves, plotted over time t, for an activation state of three first sensors 3. If a characteristic curve is at the value 0, first sensor 3 will not be operated, i.e., not heated. If the characteristic curve is at the value 1, then corresponding sensor 3 is heated, and at least one measured value is acquired with the aid of first sensor 3. The first phases of the three first sensors 3 are arranged sequentially one after the other. The first phase of a first sensor 3 ranges from a first instant t1 to a second instant t2. The first phase of a further first sensor 3 ranges from a second instant t2 to a third instant t3. The first phase of an additional first sensor 3 ranges from third instant t3 to a fourth instant t4. By activating the heated three first sensors 3 in temporal succession, an essentially constant temperature gradient or a constant temperature profile is obtained on sensor array 9.

Figure 6:
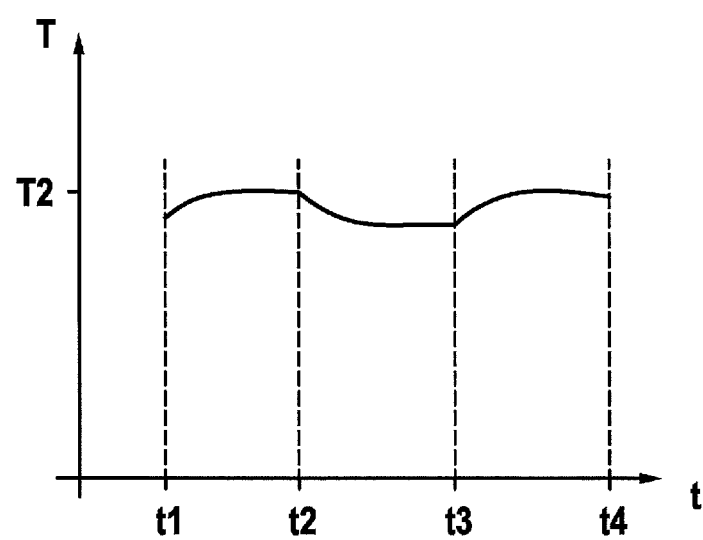
FIG. 6 shows a diagram of a temperature profile of the sensor array according to the first phases of FIG. 5.

FIG. 6 shows a corresponding temperature profile that is measured on a sensor array 9 in an operation of the three first sensors 3 according to FIG. 5. Sensor array 9 has a slightly fluctuating, but nearly constant second temperature T2 between first and fourth time intervals t1, t4.

Figure 7:
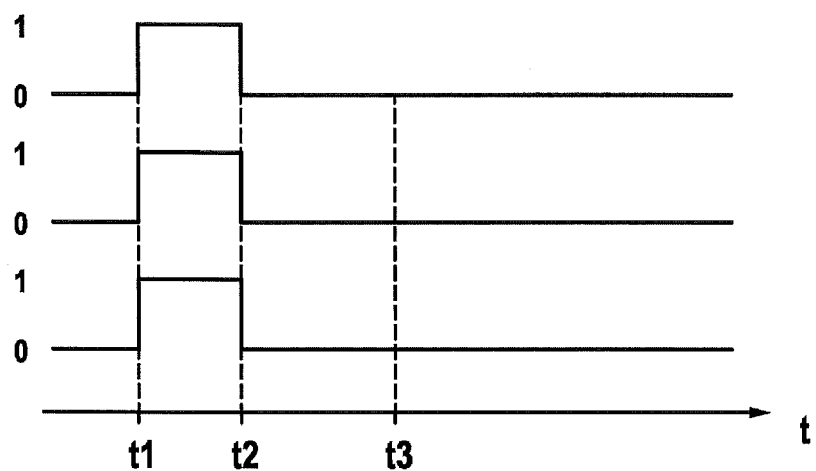
FIG. 7 shows a diagram of a further time characteristic of first phases.

FIG. 7 schematically illustrates three characteristic curves, plotted over time t, for an activation state of three first sensors 3. If a characteristic curve is at the value 0, then first sensor 3 will not be operated, i.e., not heated. If the characteristic curve is at the value 1, then corresponding first sensor 3 is heated, and at least one measured value is acquired with the aid of first sensor 3. FIG. 7 shows a method for operating three first sensors 3 and second sensors 4 of a sensor array according to FIGS. 1 through 4. In this specific embodiment, measurements are carried out by first sensors 3 during the first phase, which lies between a first instant t1 and a second instant t2. In so doing, first sensors 3 are heated to the required operating temperature by corresponding own or additional heating elements. In a subsequent second phase, which occurs between second instant t2 and a third instant t3, measurements are carried out with the aid of second sensor(s) 4.

The described method may be employed in order to use a moisture sensor as second sensor 4, for example. Possible condensation may be removed from the moisture sensor by operating a first sensor 3. When first sensor 3 is heated, second sensor 4 is simultaneously heated as well, so that condensed fluid evaporates from moisture sensor 4. This allows an upwardly expanded measuring range, possibly a more precise measurement by moisture sensor 4, without the need to provide a separate heating device for moisture sensor 4.

Baking out and a regeneration of second sensor(s) 4 is able to be achieved by an intentionally longer heating operation of one or more first sensor(s) 3 and by the temperature increase achieved in so doing. For example, this is useful if high concentrations of gases, fluids or analytes have been present, which must be removed from a housing in a rapid manner. In addition, longer heating or a continuous operation of first sensors 3 may be employed either for a direct decomposition (combustion) of an analyte on the heated, frequently catalytically actively coated first sensors. A temperature increase stemming from the heating causes a desorption of analytes or of moisture from the surfaces of first and/or second sensors 3, 4 and/or the housing.

In one further specific embodiment, the first sensors are operated in such a way that a temporally restricted temperature increase is achieved. To do so, either the heating output of the first sensors is pre-controlled, or a temperature sensor is provided, which monitors the temperature, the heating of the first sensors being controlled or regulated accordingly. The temporally restricted temperature increase may be used for a performance check or a functional enhancement of second sensors 4. For example, a moisture and/or temperature sensor as second sensor is able to be checked in that a temperature, moisture and dew point from an unheated state, i.e., during the second phase, and in a heated state, i.e., during the first phase, are sensed and compared to one another. In the same way, the temperature increase in a calometrically measuring gas sensor, for instance, is able to be measured directly and utilized for a performance check of the gas sensor. Moreover, the temperature signal may be used for checking the correct functioning of the heating elements of the first sensor, as well. When the heating element of the first sensor is switched on and is functioning correctly, the applied heating power must result in a measurable and defined temperature increase.

In one further specific embodiment, an operation may take place in such a way that a second sensor 4, which is developed as a temperature sensor, is used for monitoring an overall temperature increase within the sensor array, and the temperature is kept below a predefined limit value by controlling at least one of first sensors 3. For example, this may be accomplished by a temporal restriction of the first phase or by extending the pauses between the first phases.

Figure 8:
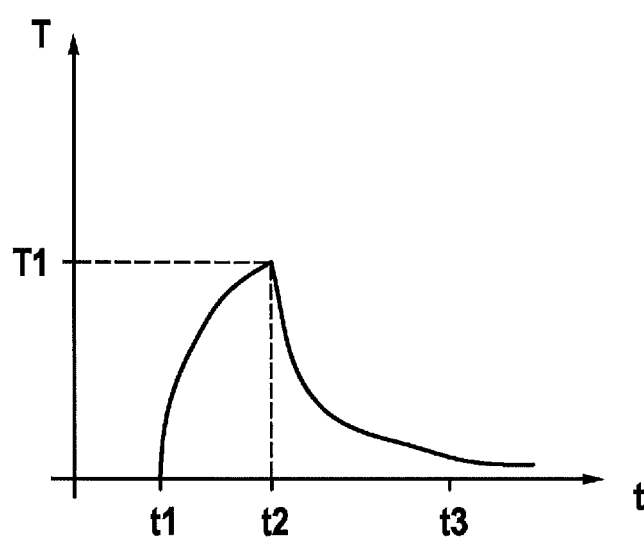
FIG. 8 shows a diagram of a resulting temperature profile of the sensor array according to the first phases of FIG. 7

FIG. 8 illustrates a temperature characteristic T over time t when using first sensors 3 according to the characteristic curves of FIG. 7. It is obvious from the diagram shown in FIG. 8 that the temperature increases to a first temperature T1 between instant t1 and an instant t2. Following second instant t2, the temperature drops again. In this specific embodiment, the second phase, during which second sensors 4 are used for acquiring the measured values, is carried out, preferably at a time offset from second instant t2. A comparison of FIG. 8 and FIG. 6 reveals that first temperature T1 of FIG. 8 is higher than second temperature T2 of FIG. 6. The operating method according to FIG. 5 thus is more suitable for second sensors 4 which exhibit particular sensitivity with regard to a temperature gradient. The operating method according to FIG. 7 is especially suitable with regard to second sensors 4 which respond sensitively to high operating temperatures and are insensitive to a temperature gradient, for example.

Given knowledge of the heating output of the heating elements of the first sensors, an ambient temperature is able to be estimated via a calibration table in one further specific embodiment, even if a temperature measurement takes place only within the sensor array. In such a temperature measurement and known output, and thus the known ambient temperature, second calibration tables may be used for compensating temperature effects on the measuring signals from the second sensors, as well. If multiple temperature sensors are used, the plausibility of the temperature measurement can be checked in addition. Apart from the heating output, a heat transfer coefficient for the output of heat from the sensor array to the environment, which is known or measured, is taken into account as well. The ambient temperature is able to be estimated based on the heating output, the heat transfer coefficient and the measured temperature of the sensor array. The measured value acquired by second sensor 4 can be corrected by comparing the temperature on the sensor array with the estimated ambient temperature, and then be output accordingly by the evaluation circuit. Predefined calibration tables, which are stored in the evaluation circuit, may be used for the calculations and estimates. Evaluation circuit 5 carries out the measurement acquisition, the measurement processing and the outputting of the corresponding measuring signals.

The described method may be used for a pulsed heating operation of first sensors 3. In this way a closed-loop control of the temperature to be adjusted, in particular a maximum temperature, is able to be adjusted with the aid of first sensors 3.

In one further specific embodiment, first sensors 3 are used for inducing a temperature increase in sensor array 9, and thus in all first and second sensors 3, 4, through a joint activation, i.e., heating in a first phase for a longer period of time, such as 500 milliseconds up to multiple seconds, or by a continuous operation as heating elements. Because of this temperature increase, typically by a temperature of 20 to 40 degrees, the following effects can be selectively induced: A desorption of gases or molecules adsorbed at housing surfaces. They may escape through a media access, whereby cleaning of the housing can take place. A desorption of molecules or gas components bound in sensor layers, and thus a regeneration of the sensor layers of the first and/or second sensors 3, 4. A performance check of a temperature sensor and the further second sensors which react to a change in temperature. Preventing the condensation of moisture, and thereby also enabling the moisture measurement under adverse ambient conditions. Increasing the reaction rate in diffusion-dependent gas sensors, for instance in sensors having field-effect transistors with a polymer or an metallo-organic coating. Lowering the moisture cross-sensitivity, for instance for polymer-based capacitive sensors or for sensors having field-effect transistors.

Figure 9:
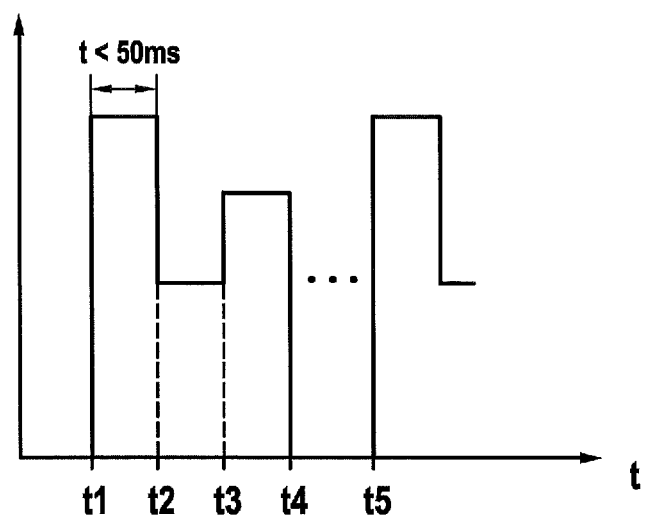
FIG. 9 shows a diagram of a time characteristic of a temperature profile and a measuring cycle.

FIG. 9 shows a diagram in a schematic illustration, in which temperature T has been plotted over time t for a first phase. The first phase, during which the at least one first sensor 3 is heated and used for acquiring a measurement, starts at a first instant t1 and ends at a fourth instant t4. In the exemplary embodiment illustrated, the first phase begins at instant t1 with a preheating phase, in which first sensor 3 is merely heated up but no measurement takes place. For example, a gas sensor may be used as first sensor 3. During the preheating phase, the temperature can be increased up to 400°, for instance, the preheating phase lasting from first instant t1 to second instant t2. The time period of the preheating phase may lie in the range of less than 50 milliseconds, for example. A first measuring phase, which lasts from second instant t2 to a third instant t3, follows the preheating phase. During the first measurement phase, the heating output of first sensor 3 is at least reduced or switched off, so that the measurement during the first measuring phase lies at an operating temperature that is less than the heating temperature during the preheating phase. In the exemplary embodiment illustrated, the first operating temperature is at 320°, for instance.

Depending on the specific embodiment selected, the first phase may end now or a second measuring phase may ensue, as illustrated in FIG. 9. The second measuring phase lasts from third instant t3 to fourth instant t4. During the second measuring phase, another measurement is carried out at a second operating temperature. However, the second operating temperature is higher than the first operating temperature. This is achieved by increasing the heating output of first sensor 3 again. Following fourth instant t4, a cooling phase follows the second measurement phase. Depending on the selected specific embodiment, a measurement may also be carried out during the cooling phase in the unheated state of first sensor 3. In addition, the second phase for the measurement may be carried out during the cooling phase with the aid of second sensor(s) 4. At fifth instant t5, following a certain period of time, a first phase starts anew.

A time period for the preheating phase, for example, may lie at maximally 100 milliseconds in order to keep the energy consumption as low as possible. In addition, the preheating phase should lie considerably above the thermal time constant of 10 to 20 milliseconds, for example, so that slower chemical desorption processes are possible after the target temperature has been reached in terms of time. The times of the first and second measurement phase likewise lie above the thermal time constant. Useful time periods depend on the gas type to be measured and lie in a range of 50 to 200 milliseconds, for example. Typical times for the cooling phase may lie in the range from 600 to 900 ms.

First sensor 3 may be used for carrying out multiple measurements during a measuring phase. In one specific embodiment, for example, measurements are also undertaken using at least one second sensor 4 during the first or second measuring phase, i.e., at a high operating temperature. The temperature gradient is able to be inferred by comparing the measured values from second sensors 4 acquired during the first or second measurement phase of first sensors 3, and measured values acquired with the aid of second sensors 4 during the cooling phase of first sensor 3. The temperature gradient is able to be taken into account when analyzing the measured values from second sensors 4 during the cooling phase, so that the measured value from second sensors 4 can be corrected. Corresponding correction tables may be stored in a memory of the evaluation circuit for this purpose. To do so, the second sensors transmit the measured values to the evaluation circuit. The evaluation circuit corrects the measured values according to the correction table and the temperature gradient and outputs the corrected measured value.

In one further specific embodiment, the first sensors are read out at least once during the cooling phase, especially multiple times sequentially one after the other. The validity of the data, i.e., the operativeness of the first sensors, can be checked in that the measured values of the same sensor must sequentially lie within a predefined interval. The predefined interval can be reconciled with the temperature gradient. The check is implemented by the evaluation circuit, for example.

What is claimed is:

1. A method for operating a sensor array using a first sensor and a second sensor, the second sensor for operated at an ambient temperature, the first sensor representing a heated sensor, which is configured for an operation at an operating temperature that lies above the ambient temperature, the first and the second sensor being connected to one another via a carrier, the carrier bringing about thermal coupling between the first and second sensor, the method comprising:

heating the first sensor to the operating temperature during a first phase;

performing a measurement by the first sensor during the first phase;

one of deactivating and reducing the heating in a second phase;

performing a measurement by the second sensor during the second phase, taking into account an increased temperature of the second sensor on account of the heating during the first phase in an evaluation of the measurement of the second sensor, wherein:

the first sensor includes one of a heating plate having a heated diaphragm, a heated sensor, a sensor for measuring a thermal conductivity, a gas sensor, and a heated chemical gas sensor, and the second sensor includes one of a polymer-coated sensor, a capacitive sensor, a calometrically measuring sensor, an air-pressure sensor, a moisture sensor, a gas sensor, and a field-effect-based sensor, and one of the heating plate, a heating element, and the heated sensor is actuated for the heating of the first sensor; and acquiring a temperature of the first sensor, wherein the heating during the first phase is controlled so that a predefined maximum temperature for the second sensor is not exceeded.

2. The method as recited in claim 1, further comprising: performing at least one of:

restricting a temperature for the heating during the first phase; and extending a time interval between two first phases in order not to exceed a maximum temperature for the second sensor.

3. The method as recited in claim 1, wherein multiple first phases are executed at time intervals, and wherein second phases are executed between two first phases.

4. The method as recited in claim 1, wherein:

a preheating phase takes place during the first phase, during which the heating of the first sensor to a first temperature occurs, the first sensor carries out two measurements at two different temperatures during a following measuring phase.

5. The method as recited in claim 4, wherein:

a cooling phase follows the first phase, and the first sensor carries out a third measurement during the cooling phase.

6. A method for operating a sensor array using a first sensor and a second sensor, the second sensor for operated at an ambient temperature, the first sensor representing a heated sensor, which is configured for an operation at an operating temperature that lies above the ambient temperature, the first and the second sensor being connected to one another via a carrier, the carrier bringing about thermal coupling between the first and second sensor, the method comprising:

heating the first sensor to the operating temperature during a first phase;

performing a measurement by the first sensor during the first phase;

one of deactivating and reducing the heating in a second phase;

performing a measurement by the second sensor during the second phase;

taking into account an increased temperature of the second sensor on account of the heating during the first phase in an evaluation of the measurement of the second sensor, wherein:

the first sensor includes one of a heating plate having a heated diaphragm, a heated sensor, a sensor for measuring a thermal conductivity, a gas sensor, and a heated chemical gas sensor, and the second sensor includes one of a polymer-coated sensor, a capacitive sensor, a calometrically measuring sensor, an air-pressure sensor, a moisture sensor, a gas sensor, and a field-effect-based sensor, and one of the heating plate, a heating element, and the heated sensor is actuated for the heating of the first sensor;

wherein the first sensor is one of the gas sensor and the heated chemical gas sensor, and wherein the first sensor includes a metal-oxide sensor.

7. A method for operating a sensor array using a first sensor and a second sensor, the second sensor for operated at an ambient temperature, the first sensor representing a heated sensor, which is configured for an operation at an operating temperature that lies above the ambient temperature, the first and the second sensor being connected to one another via a carrier, the carrier bringing about thermal coupling between the first and second sensor, the method comprising:

heating the first sensor to the operating temperature during a first phase;

performing a measurement by the first sensor during the first phase;

one of deactivating and reducing the heating in a second phase;

performing a measurement by the second sensor during the second phase;

taking into account an increased temperature of the second sensor on account of the heating during the first phase in an evaluation of the measurement of the second sensor, wherein:

the first sensor includes one of a heating plate having a heated diaphragm, a heated sensor, a sensor for measuring a thermal conductivity, a gas sensor, and a heated chemical gas sensor, and the second sensor includes one of a polymer-coated sensor, a capacitive sensor, a calometrically measuring sensor, an air-pressure sensor, a moisture sensor, a gas sensor, and a field-effect-based sensor, and one of the heating plate, a heating element, and the heated sensor is actuated for the heating of the first sensor;

performing a comparison measurement by the second sensor during the first phase; and taking into account the comparison measurement for evaluating an operativeness of at least one of the first sensor and the second sensor.

8. A method for operating a sensor array using a first sensor and a second sensor, the second sensor for operated at an ambient temperature, the first sensor representing a heated sensor, which is configured for an operation at an operating temperature that lies above the ambient temperature, the first and the second sensor being connected to one another via a carrier, the carrier bringing about thermal coupling between the first and second sensor, the method comprising:

heating the first sensor to the operating temperature during a first phase;

performing a measurement by the first sensor during the first phase;

one of deactivating and reducing the heating in a second phase;

performing a measurement by the second sensor during the second phase, taking into account an increased temperature of the second sensor on account of the heating during the first phase in an evaluation of the measurement of the second sensor, wherein:

the first sensor includes one of a heating plate having a heated diaphragm, a heated sensor, a sensor for measuring a thermal conductivity, a gas sensor, and a heated chemical gas sensor, and the second sensor includes one of a polymer-coated sensor, a capacitive sensor, a calometrically measuring sensor, an air-pressure sensor, a moisture sensor, a gas sensor, and a field-effect-based sensor, and one of the heating plate, a heating element, and the heated sensor is actuated for the heating of the first sensor;

estimating an ambient temperature, taking into account a power of the heating of the first sensor during the first phase and a temperature measurement on the sensor array; and evaluating the measurement by the second sensor based on a consideration of the estimated ambient temperature.

9. The method as recited in claim 8, wherein the evaluating of the measurement by the second sensor includes one of correcting and checking a measured value of the second sensor for a malfunction.

10. A sensor array, comprising:
a first sensor;
a second sensor;
a carrier on which the first sensor and the second sensor are located;
wherein:
the second sensor is configured for an operation at an ambient temperature,
the first sensor is configured for an operation at an operating temperature that lies above the ambient temperature,
the first sensor and the second sensor are connected to one another via the carrier,
the carrier brings about a thermal coupling between the first and second sensors; and
an evaluation circuit is configured for acquiring a measured value using the second sensor during a second phase, during which a heating of the first sensor is one of switched off and reduced,
the evaluation circuit is configured for taking into account an increased temperature of the second sensor as a result of the heating during a first phase in an evaluation of the measurement by the second sensor, and
wherein the second sensor is situated on the evaluation circuit, and the evaluation circuit is disposed on the carrier.

11. The sensor array as recited in claim 10, wherein the evaluation circuit acquires a measured value of the first sensor during the first phase, during which the first sensor is heated.

12. The sensor array as recited in claim 10, further comprising:
a housing in which the first sensor and the second sensor are, wherein:
the housing includes a media access, and
the first sensor is disposed closer to the media access than the second sensor.

13. The sensor array as recited in claim 12, wherein the first sensor is situated adjacent to the media access.

14. The sensor array as recited in claim 10, wherein the carrier is made from a heat-conducting material.

15. The sensor array as recited in claim 10, further comprising:
a thermally conductive connection layer via which the evaluation circuit is connected to the carrier.

16. A sensor array, comprising:
a first sensor;
a second sensor;
a carrier on which the first sensor and the second sensor are located;
wherein:
the second sensor is configured for an operation at an ambient temperature,
the first sensor is configured for an operation at an operating temperature that lies above the ambient temperature,
the first sensor and the second sensor are connected to one another via the carrier,
the carrier brings about a thermal coupling between the first and second sensors; and
an evaluation circuit is configured for acquiring a measured value using the second sensor during a second phase, during which a heating of the first sensor is one of switched off and reduced,
the evaluation circuit is configured for taking into account an increased temperature of the second sensor as a result of the heating during a first phase in an evaluation of the measurement by the second sensor, and
wherein the first sensor includes four first sensors and the second sensor includes four second sensors, and wherein the four first sensors and the four second sensors are situated on the carrier in a spatially separated manner.

* * * * *